| United States Patent [19] | [11] 3,790,422 |
|---|---|
| Jourquin | [45] Feb. 5, 1974 |

[54] PROCESS FOR THE AGGLOMERATION OF FLAKES OF EXPANDED POLYURETHANE

[75] Inventor: Lucien Edmond Jourquin, Wetteren, Belgium

[73] Assignee: Sobapur S.A., Luxembourg, Luxembourg

[22] Filed: Oct. 19, 1970

[21] Appl. No.: 82,191

[30] Foreign Application Priority Data
Oct. 17, 1969 Belgium .............................. 740446

[52] U.S. Cl. ............... 156/306, 156/62.2, 156/308, 161/168, 260/2.5 AY, 264/109, 264/123, 264/126
[51] Int. Cl. ................................................ C09j 5/00
[58] Field of Search ... 156/62.2, 306, 308; 161/168; 260/2.5 AY; 264/109, 123, 126

[56] References Cited
UNITED STATES PATENTS

| 3,573,153 | 3/1971 | Ryan ................................. 161/159 |
| 3,594,335 | 7/1971 | Schultz et al. ...................... 260/2.5 |
| 2,994,110 | 8/1961 | Hardy ................................ 264/112 |
| 3,100,733 | 8/1963 | Bundy .............................. 264/126 X |
| 3,114,722 | 12/1963 | Einhorn et al. ..................... 260/2.5 |
| 2,917,489 | 12/1959 | Gladding et al. .................. 260/77.5 |

Primary Examiner—Alfred L. Leavitt
Assistant Examiner—Robert A. Dawson
Attorney, Agent, or Firm—Sughrue, Rothwell, Mion, Zinn & Macpeak

[57] ABSTRACT

A process for the agglomeration of expanded polyurethane flakes comprising compressing the flakes at a temperature of between 180°C and 230°C is disclosed. Under the pressure, —NCO radicals in the flakes react with —OH radicals in the flakes.

12 Claims, No Drawings

PROCESS FOR THE AGGLOMERATION OF FLAKES OF EXPANDED POLYURETHANE

This invention relates to a process for the agglomeration of flakes of expanded polyurethane by compressing the flakes under heat.

The methods known hitherto, whereby flakes of expanded polyurethane can be bonded together to form a cohesive mass of that substance, generally consist of sticking the flakes together by means of a binder while some degree of pressure is applied to them.

The binders may be of various compositions, but the one most often used is known as "polyurethane pre-polymer." This may be defined as a reaction product of a phenol with an isocyanate that has been heated to a temperature in the region of 80°C. The phenol is a polyether of the same type as that employed in the preparation of expanded polyurethane, while the isocyanate is generally toluene diisocyanate. As a result of heating these binder constituents to a temperature of about 80°C., they undergo partial polymerisation, known as "pre-polymerisation," the OH terminal radicals of the polyether being replaced by NCO terminal radicals.

When the flakes are damped with this binder, it is necessary to carry out polycondensation of the said prepolymer. This can be done by wetting the flakes with water, before or after the addition of the pre-polymer, in addition, perhaps, to the application of heat to the whole, to accelerate the polycondensation reaction, during which carbon dioxide is evolved.

The flakes treated with water and the pre-polymer are compressed at ambient temperature to the density required, until completion of the polycondensation reaction, that is to say for about 12 hours.

A faster method is to sprinkle the flakes with the prepolymer, then to compress them and to subject the whole to low-pressure steaming in an autoclave. By the simultaneous action of moisture and heat, the polycondensation reaction is completed in about 15 minutes.

The flakes of expanded polyurethane may be mixed with rubber waste, cork waste, textile fibres and so forth.

The methods referred to above have the disadvantage of yielding a product that has too little mechanical strength for many applications.

The purpose of the present invention is essentially to eliminate this drawback while offering a process which is technically simpler to carry out than those known hitherto.

To that end, according to the invention, the flakes of expanded polyurethane are compressed at a temperature of between 180°C. and 230°C., so as to bring the urethane compounds to a state of unstable equilibrium and enable the —NCO radicals of particular flakes, formed at that temperature, to react, under the influence of pressure, with —OH radicals of adjacent flakes, thus bringing about a chemical bond between those flakes, the reaction being as follows:

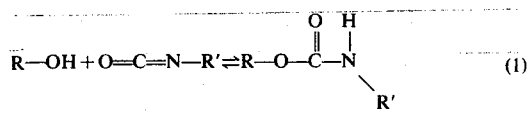

(1)

In one particularly advantageous form of the proposed process, the flakes of polyurethane are treated with a binder containing a pre-polymer of polyurethane with —NCO terminal radicals, this pre-polymer being formed as a reaction product of a phenol with an isocyanate that has been heated to a temperature of between 70°C. and 90°C., so as to fix the said —NCO radicals of the binder to the active hydrogen radicals of the flakes of expanded polyurethane when the flakes are compressed at a temperature of between 180°C. and 230°C., a cross-linking agent containing active hydrogen atoms being added to the pre-polymer to maintain equilibrium between the NCO and the H radicals.

In one particular form of the process, according to the invention, fillers consisting of textile fibres having free hydrogen radicals, such as cotton or polyamide fibres — nylon, for example — are added to the flakes of expanded polyurethane, so that those hydrogen radicals may react with the —NCO radicals of the pre-polymer and form a chemical bond with them.

Further details and features of the invention will become apparent from the following description, given by way of example only, of various practical forms of the process here proposed.

The process, according to the invention, is based both on the reversibility of reaction of urethane at high temperature and on the reactivity of free —NCO radicals with the mobile hydrogen atoms of the polyurethane flakes it is desired to agglomerate.

It has been found that when expanded polyurethane is heated, there is a critical temperature at which the urethane compounds are in a state of unstable equilibrium, the reaction being as follows:

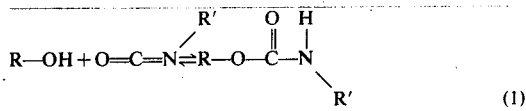

(1)

in which R and R' represent radicals, of whatever nature, of the phenols and isocyanates used for the preparation of polyurethane. They may be, for example, polyether and/or polyester radicals.

Intermolecular reactions taking place at a temperature of between 180°C. and 230°C. confer special properties on the expanded substance. NCO radicals liberated at that temperature from particular flakes are able to react at a pressure of between 0.1 and 10 kg./sq.cm. with OH radicals likewise liberated at that temperature from adjacent flakes, so as to create between two separate flakes a chemical bond linking them closely together The reversibility of the reaction of urethane formation depends on the nature of the R and R' groups. It has been found, for instance, that flakes of expanded polyurethane having a base of polyester phenols can be better and more easily agglomerated than flakes of polyurethane having a polyether phenol base.

To increase the mechanical strength of the agglomerated flakes, the flakes are mixed with a binder known as polyurethane pre-polymer, which has NCO terminal radicals. Tis is a pre-polymer of the same type as that used in the processes described in the foregoing.

According to the invention, however, this binder is not subjected to polycondensation by water, as in existing processes, but by a cross-linking agent, which is a relatively small molecule with several active hydrogen atoms, such as it is usual to employ in the preparation of urethane elastomers. The mechanical properties of the elastomer formed depend, as is well known, on the nature and quantity of the phenols and isocyanates used as well as on the nature of whatever cross-linking agent and catalysts may be employed. In the process here proposed, the quantity of cross-linking agent used will be kept below the stoichiometric quantity, of the order of 40 percent to 90 percent, so that NCO radicals may still be available in the pre-polymer for reaction, brought about by heat and catalysts, with the mobile hydrogen atoms in the flakes of expanded substance, so as to be fixed to the latter.

Expanded polyurethane does in fact still have many free atoms of active hydrogen. These consist, for example, of hydrogen in the urethane radical, which reacts with the isocyanate to form allophanate compounds, thus:

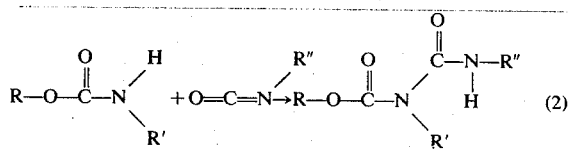

or of hydrogen from the ureas formed in the foaming reaction between water and the isocyanate so as to form biuret compounds, thus:

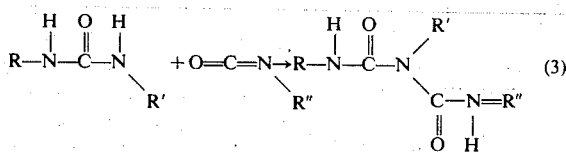

The cross-linking agents referred to above are relatively small molecules with several very active hydrogen atoms. These agents may be formed, for example, from trimethylol propane, 1-4 butanediol, 4-4' methylene-bis-o-chloroaniline, triiso-propanolamine, hydroquinone DI (B-hydroxyethyl) ether, methylene diamine or 1,2,6 hexanetriol. The quantities used are generally about 40 percent to 90 percent of the stoichiometric quantity.

The catalysts already referred to are intended to accelerate any cross-linkage. The catalyst used, per 100 parts by weight of pre-polymer, should preferably be 0.2 part of lead octoacte, 0.3 part of dibutyl dilaurate of tin, 0.2 part of mercury phenyl acetate or 0.6 part of tin octoate.

The radicals R and R' in the above reaction (1) can be further described as follows:

The radical R designates a phenol chain with terminal OH groups. This chain may be formed by the condensation of polyoxyalkylenes, such as polyoxyethylene or polyoxypropylene. It may also be a polyester with terminal OH groups, such as the reaction product of adipic acid with diethylene glycol, which may form cross-linkages with other polyalcohols having at least three OH groups, such as, for example, glycerine, trimethylol propane and so on. The radical R' is linked to the NCO radical. The compounds mostly used are toluene isocyanate and diphenyl methane diisocyanate.

To increase further the mechanical strength of the product obtained, fillers are added to the flakes in another form of the process now proposed, these fillers being, for example, textile fibres, preferably having free atoms of active hydrogen capable likewise of reacting with the NCO radicals of the prepolymer already mentioned. Particularly suitable fillers are, for instance, cotton and nylon fibres.

A few examples of experiments carried out in various conditions are given below.

EXAMPLE 1

Flakes of expanded polyurethane polyester are compressed so as to produce a sheet having an apparent density of between 80 and 300 kg./cu.cm. The flakes are then heated in the compressed state to a temperature of about 220°C. The time required to produce the chemical bond already referred to between the NCO and OH radicals depends on the thickness of the layer of compressed flakes. For a thickness of 2.5 cm., for example, the time taken is one hour.

EXAMPLE 2

A mixture is prepared of 40 parts of weight of waste fibres, such as cotton, nylon or polyester, with 60 parts by weight of ground flakes of expanded polyurethane. The resultant mix is sprayed with 20 parts by weight of urethane pre-polymer containing a catalyst. The pre-polymer consists of 75 parts by weight of polyether of the same type as those used for making expanded polyurethane and 25 parts by weight of toluene diisocyanate, the whole being heated at 80°C. for one hour and then cooled. After cooling, 0.1 part by weight of dibutyl dilaurate of tin is added.

The flakes sprayed with this pre-polymer are then compressed to form a sheet of the desired thickness and density and heated for 5 to 15 minutes at 200°C.

EXAMPLE 3

A quantity of 88 parts by weight of flakes of expanded polyurethane is sprayed with 12 parts by weight (dry state) of binding agent. The flakes thus sprayed are then compressed to the desired density and heated at 200°C. for one minute. The binding agent in question consists of a pre-polymer and a solution of cross-linking agent. The pre-polymer consists of 80 parts by weight of a compound having the following characteristics:
- polyethertriol
- molecular weight 3000
- nucleus: trimethylol propane
- chain: propylene oxide
- OH index: 56 and of 20 parts by weight of 80/20 toluene diisocyanate.

These two ingredients are heated to 85°C. to 90°C. in a stream of nitrogen, agitation being applied. After reaction between them, the theoretical percentage of NCO radicals is 6.31. It has been found experimentally that the actual percentage is 5.72. The viscosity at 21°C. is 20,350 cP. measured by Brookfield's No. 4 probe.

The cross-linkage agent consists of 14.5 parts by weight of 4-4 methylene-bis-o-chloroaniline, that is to say 80 percent of the stoichiometric quantity, and 14.5 parts by weight of methyl ethyl ketone by way of solvent.

The binding agent has a viscosity of 500 to 600 cP. and will keep for 45 minutes.

The following table gives details regarding the tensile strength, in conformity with ASTM D 1564–63 T, of the agglomerate obtained and clearly shows the effect of the cross-linkage method.

| Pre-polymer + water as cross-linking agent | | Pre-polymer + 4-4-methylene-bis-o-chloroaniline as cross-linking agent | |
|---|---|---|---|
| Apparent density | kg./sq.cm. | Apparent density | kg./sq.cm. |
| 96 | 0.51 | 69 | 1.07 |
| 101 | 0.61 | 102 | 2.07 |
| 136 | 0.96 | 109 | 2.53 |
| 140 | 1.55 | 110 | 2.4 |

EXAMPLE 4

A quantity of 48 parts by weight of expanded polyurethane with 40 parts by weight of cotton fibres is sprayed with 12 parts by weight (dry state) of binding agent. Then, as in Example 3, the whole is compressed to the desired density and heated at 200°C. for one minute. The binding agent used is the same as described in Example 3.

The following table gives details regarding the tensile strength, in conformity with ASTM D 1564–63 T, of the agglomerate obtained and clearly shows the effect of the cross-linkage method and of the addition of fibres to the flakes.

| Pre-polymer + water as cross-linking agent | | Pre-polymer + 4-4-methylene-bis-o-chloroaniline as cross-linking agent | |
|---|---|---|---|
| Apparent density | kg./sq.cm. | Apparent density | kg./sq.cm. |
| 128 | 1.8 | 100 | 2.5 to 2.9 |
| 185 | 3.1 | 115 | 3.2 |
| – | – | 207 | 11.7 |

For the control samples employing water as the cross-linking agent, shown in the left-hand column of both the foregoing tables, the pre-polymer used was diluted with methyl chloride to reduce its viscosity to 500 to 600 cP., corresponding to that used for the samples treated in accordance with the invention, shown in the right-hand column of those tables. Cross-linkage is brought about with steam at 120°C. while the flakes are compressed.

EXAMPLE 5

The following experiment is very similar to that described in Example 1.

Flakes of expanded polyurethane polyester are agglomerated under pressure in a layer 2.5 cm. thick, for one hour, at a temperature of 220°C., without the use of any pre-polymer or fibres.

When the density of the resultant agglomerate is 178, the tensile strength is 1.74 kg./sq.cm., whereas, when the density of the agglomerate is 203, the tensile strength is 2.53 kg./sq.cm.

The sheets of flakes compressed and agglomerated, with the addition of fillers, may well be employed, by virtue of their great mechanical strength, for backing carpets, in which case the sheets are applied to the back of the carpet.

By the use, in accordance with the invention, of relatively large amounts of pre-polymer in proportion to the quantity of flakes, it is possible to improve the mechanical properties of the resultant product. For example, it is possible to add, to 70 parts by weight of very finely ground flakes, 30 parts by weight of pre-polymer and to compress the whole to give a density of 400 kg./cu.cm. The sheets so obtained have a microcellular structure and can be used as imitation leather.

The invention is naturally not limited to the practical forms described. Many modifications thereof are possible within the scope of the invention.

What I claim is:

1. A process for the agglomeration of flakes of expanded polyurethane which comprises:

compressing said flakes under heat, whereby the flakes of expanded polyurethane are compressed at a pressure of from 0.1 to 10 Kg/sq. cm. and are heated at a temperature of from 180°C to 230°C, for a sufficient time so as to bring the urethane compound to a state of unstable equilibrium, thus enabling the —NCO radicals of particular flakes, formed at that temperature, to react, under the influence of pressure with —OH radicals of adjacent flakes, thus bringing about only a chemical bond between said flakes, the reaction occurring being described as follows:

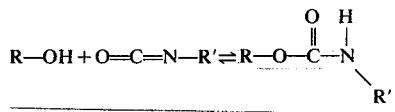

2. The process of claim 1, wherein the flakes of polyurethane are mixed before they are compressed with a pre-polymer of polyurethane having —NCO terminal radicals, said pre-polymer being formed as a reaction product of a polyol with an isocyanate which has been heated to a temperature of from 70° to 90°C, so as to fix said —NCO radicals of said pre-polymer to the active hydrogen atoms of the flakes of expanded polyurethane when the flakes are compressed at a temperature of from 180° to 230°C, a cross-linking agent containing active hydrogen atoms being added to the pre-polymer for the purpose of maintaining equilibrium between the —NCO groups and the hydrogen radicals.

3. The process of claim 2, wherein said cross-linking agent is a member selected from the group consisting of trimethylolpropane, 1-4-butanediol, 4-4'-methylene-bis-o-chloroaniline, triso-propanolamine, hydroquinone DI(B-hydroxyethyl) ether, methylene diamine, and 1,2,6 hexametriol.

4. The process of claim 2, wherein said cross-linking agent is employed in an amount which is below the stoichiometric quantity of the order of 40 to 90 percent.

5. The process of claim 1, wherein said flakes of polyurethane are mixed with a binding agent before they are compressed.

6. The process of claim 5, wherein fillers are added to the polyurethane flakes before the latter are compressed.

7. The process of claim 6, wherein fillers consisting of textile fibers having free hydrogen radicals, selected from among cotton or polyamide fibers — nylon are added to said flakes of expanded polyurethane in order that the hydrogen radicals may react with the —NCO radicals of the pre-polymer and form a chemical bond therewith.

8. The process of claim 2, wherein a catalyst employed for the purpose of promoting the reaction between the —NCO radicals and the active hydrogen radicals in the flakes of the expanded polyurethane is added to the pre-polymer.

9. The process of claim 1, wherein the flakes of expanded polyurethane are ground before they are compressed.

10. The process of claim 1, wherein the flakes of expanded polyurethane are compressed so as to form a sheet suitable for use as a backing for carpet material.

11. The process of claim 1, wherein said flakes of expanded polyurethane are heated at a temperature of 200°C.

12. The process of claim 1, wherein said flakes of expanded polyurethane are heated at a temperature of 220°C.

* * * * *